US010693220B2

(12) United States Patent  
Ortigosa et al.

(10) Patent No.: US 10,693,220 B2  
(45) Date of Patent: Jun. 23, 2020

(54) ANTENNA MODULES FOR VEHICLES

(71) Applicant: Advanced Automotive Antennas, S.L.U., Barcelona (ES)

(72) Inventors: Enrique Martinez Ortigosa, L'Hospitalet del Llobregat (ES); Ramiro Illera Quintero, El Masnou (ES); Juan Gemio Valero, Sant Quirze del Valles (ES); Laura Tantiña Cuni, Martorellas (ES)

(73) Assignee: ADVANCED AUTOMOTIVE ANTENNAS, S.L.U, Barcelona (ES)

( * ) Notice: Subject to any disclaimer, the term of this patent is extended or adjusted under 35 U.S.C. 154(b) by 0 days.

(21) Appl. No.: 16/038,976

(22) Filed: Jul. 18, 2018

(65) Prior Publication Data

US 2019/0027818 A1 Jan. 24, 2019

(30) Foreign Application Priority Data

Jul. 18, 2017 (EP) .................................... 17382472

(51) Int. Cl.
*H01Q 1/32* (2006.01)
*H01Q 21/28* (2006.01)
*H01Q 1/52* (2006.01)
*H01Q 1/24* (2006.01)
*H01Q 21/30* (2006.01)
*H04B 7/0413* (2017.01)

(52) U.S. Cl.
CPC .......... *H01Q 1/3275* (2013.01); *H01Q 1/246* (2013.01); *H01Q 1/521* (2013.01); *H01Q 21/28* (2013.01); *H01Q 21/30* (2013.01); *H04B 7/0413* (2013.01); *H01Q 1/3241* (2013.01)

(58) Field of Classification Search
CPC ...... H01Q 1/32; H01Q 1/3275; H01Q 1/3241; H01Q 1/246; H01Q 21/30
See application file for complete search history.

(56) References Cited

U.S. PATENT DOCUMENTS

| 4,737,795 A * | 4/1988 | Nagy .................... | H01Q 1/3275 343/708 |
| 9,966,659 B2 * | 5/2018 | Chakam ................ | H01Q 1/1214 |
| 2011/0012798 A1 * | 1/2011 | Triolo ...................... | H01Q 3/24 343/713 |
| 2014/0043204 A1 * | 2/2014 | Basnayake ........... | H01Q 1/3275 343/872 |
| 2015/0071137 A1 * | 3/2015 | Thiam .................. | H01Q 9/0407 370/297 |

FOREIGN PATENT DOCUMENTS

EP 1903632 A1 * 3/2008 ............. H01Q 1/088

* cited by examiner

*Primary Examiner* — Hoang V Nguyen  
(74) *Attorney, Agent, or Firm* — Cantor Colburn LLP

(57) ABSTRACT

Antenna modules for vehicles are disclosed. The antenna modules may be arranged on elongated bases and may be configured to be mounted in 5 cavities of top parts of vehicles. They may comprise a plurality of antennas distributed along the elongated bases. The plurality of antennas may comprise at least multiple-input multiple-output (MIMO) mobile communications antennas and global navigation satellite system (GNSS) antennas.

15 Claims, 5 Drawing Sheets

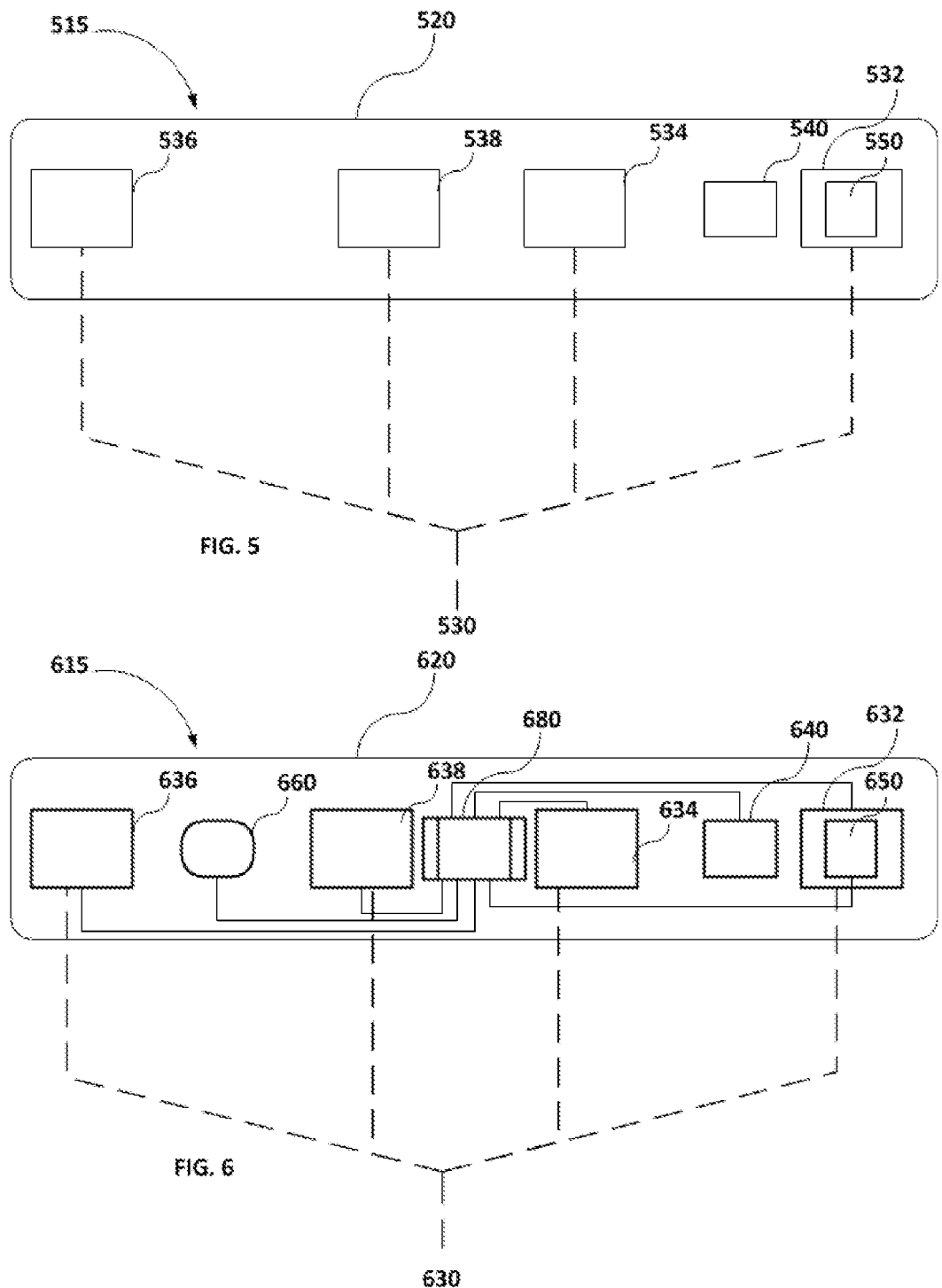

ANTENNA MODULES FOR VEHICLES

CROSS-REFERENCES TO RELATED APPLICATIONS

This application claims the benefit of European Application No. 17382472.3 filed Jul. 18, 2017, which is incorporated herein by reference in its entirety.

BACKGROUND

The present disclosure relates to antenna modules, and more specifically to antenna modules for vehicles.

A typical vehicle may host antennas for various wireless technologies, such as telephony (up to 4 antennas if Multiple Input Multiple Output (MIMO) antennas are used), global navigation satellite system (GNSS), Satellite Digital Audio Radio Service (SDARS), Remote Key Entry (RKE), AM/FM/Digital Audio Broadcasting (DAB) etc. The number of antennas that may possibly be hosted in a vehicle is increasing with time. Traditionally, antennas are integrated in different locations of a vehicle. Such locations may vary. Example locations include the external rear view mirror, the Shark fin, the windscreen, the bumpers, the rain sensor position, the dashboard, etc.

The exterior view mirror is an external element of the car. Its available area is generally limited. Changes in the mirror design often imply an antenna redesign. As for the shark fin, this location is used mostly for telephony and GNSS. However, it is a visible location, and furthermore the available area is limited so, for instance, it is not feasible to implement a 4×4 MIMO antenna solution in the shark fin. With respect to the dashboard, it is mainly used for telephony, GNSS and RKE. However, performance of the antennas in the dashboard can be degraded if a thermal layer is used and especially for GNSS antennas because the GNSS antenna diagram pattern is pointing to the zenith (towards the GNSS satellites in the sky).

It is desirable to provide a solution for integrating various antennas at a single position of the vehicle to overcome at least some of the aforementioned issues.

SUMMARY

In a first aspect, an antenna module is provided. The antenna module may comprise an elongated base. The elongated base may be configured to be mounted in a cavity of a top part of a vehicle. The antenna module may further comprise a plurality of antennas distributed along the elongated base. The plurality of antennas may comprise at least a multiple-input multiple-output (MIMO) mobile communications antenna and a global navigation satellite system (GNSS) antenna. The MIMO antenna may comprise at least a first mobile communications antenna and a second mobile communications antenna. The first mobile communications antenna may have a transmitting (Tx) and a receiving (Rx) element and the second mobile communications antenna may have at least an Rx element. The GNSS antenna may be arranged between the first mobile communications antenna and the second mobile communications antenna of the MIMO antenna at a distance to maximize isolation between the antennas.

GNSS may refer to any satellite navigation system, such as Global Positioning System (GPS), the Global Navigation Satellite System (GLONASS) or Galileo. The GNSS antenna may be first (GNSS-1) or second (GNSS-2) generation GNSS antennas. It may, therefore, use either first or second generation frequency bands. More specifically, for GNSS-2, the GNSS antenna may use L1 and L2 frequencies of the L frequency band (1 to 2 GHz range of the radio spectrum). However, the GNSS antennas used as part of the invention may use other or further frequencies of the L band (e.g. L5) or other bands of the radio spectrum as GNSS systems are developing.

Antenna to antenna isolation is a measure of how tightly coupled antennas are. Typically, antenna isolation is measured for antennas on the same module or product. When specified in this manner, the isolation should be as large as possible. The minimum level of isolation between antennas may change as a function of the antenna's services and of the antenna functionality for Transmitting or Receiving. In order to achieve a proper power balance between the antenna's ports a minimum value of 10 dB of isolation is required in spite of the service or the antenna's functionality.

By providing the antenna module in a cavity it is possible to integrate all antennas in a single location and maximize isolation by distributing the antennas along the elongated base. Furthermore, by providing the cavity in a top part of the vehicle, the antennas may be invisible and interference with other electronic parts of the vehicle or with other devices in the interior of the vehicle may be minimized.

In some examples, the distance between the first and second mobile communication antennas may be selected so that the isolation between the first and second mobile communication antennas is at least 17 dB. More specifically, when one of the mobile communication antennas comprises a Tx element then the isolation from other antennas (e.g. Rx antennas or GNSS antennas) may need to be at least 20 dB to avoid causing interference to the other antennas.

In some examples the antenna module may further comprise a Satellite DARS (SDARS) antenna. The SDARS antenna may be arranged with one of the mobile communication antennas, preferably on top of the second mobile communication antenna. SDARS antennas have a different radiation pattern than telephony antennas (e.g. LTE MIMO antennas). SDARS antennas may demonstrate a hemispherical pattern for communication to Satellites whereas Telephony antennas may demonstrate an omnidirectional pattern for communication at lower elevation angles towards terrestrial Telephony Base Stations. Due to the antenna pattern behavior, even if the SDARS antenna is close to the telephony antenna, a high level of isolation is obtained between them.

In some examples the MIMO antenna may further comprise a third mobile communications antenna having a Tx and an Rx element. The distance between the third mobile communication antenna and the first mobile communications antenna may be selected so that the isolation between the third mobile communication antenna and the first mobile communication antenna is at least 17 dB.

In some examples the MIMO antenna may further comprise a fourth mobile communication antenna having at least an Rx element. The distance between the Rx element of the fourth mobile communication antenna and the Rx element of the second mobile communication antenna may be selected so that the isolation between the Rx element of the fourth mobile communication antenna and the Rx element of the second mobile communication antenna is at least 10 dB. As both antennas are Rx antennas only, lower isolation requirement may be present and, thus, shorter distances between the respective antennas along the elongated base may be maintained.

In some examples the MIMO antenna may be a 4×4 MIMO antenna, i.e. it may comprise four mobile communications antennas. Then, the third mobile communication antenna may be arranged at a first end of the elongated base, the fourth mobile communication antenna may be arranged at a distance of at least 200 mm from the third mobile communication antenna, the second mobile communication antenna may be arranged at a distance of at least 90 mm from the fourth mobile communication antenna and the first mobile communication antenna may be arranged at the second end of the elongated base at a distance of at least 200 mm from the second mobile communication antenna. The GNSS antenna may be arranged between the second mobile communication antenna and the first mobile communications antenna, at a distance of at least 100 mm from the first mobile communications antenna. If an SDARS antenna is also present, the SDARS antenna may be arranged on top of one of the mobile communication antennas.

In some examples the antenna module may further comprise a remote keyless entry (RKE) antenna arranged at a space along the elongated base. The RKE antenna may be arranged between two of the mobile communication antennas. For example, the RKE antenna may be placed along the elongated base between the first and the second mobile communication antennas. The distance from the other antennas may be selected so as to have at least 10 dB isolation from receiving only antennas (Rx, SDARS or GNSS) and 25 dB from transmitting antennas (Tx).

In some examples, the antenna module may further comprise a telecommunication control unit (TCU). The TCU may be electrically coupled to each of the plurality of antennas. The TCU may be arranged at a space along the elongated base. For example, the TCU may be arranged along the elongated base at a space between two of the mobile communication antennas.

In some examples the antenna module may comprise a 3×3 MIMO antenna, a GNSS antenna and a SDARS antenna. The 3×3 MIMO antenna may comprise a first mobile communication antenna, a second mobile communication antenna and a third mobile communication antenna with a splitter circuit to implement a first communication port and a second communication port. The first mobile communication antenna may comprise a Tx element and an Rx element. The second mobile communication antenna may comprise an Rx element. The third mobile communication antenna may comprise a Tx element and an Rx element. This third mobile communication antenna may be associated with a splitter circuit which may comprise a first communication port with a Tx element and an Rx element and a second communication port with an Rx element.

In some examples, the elongated base may have a tapered shape with perforations at the ends to receive screws to be fitted on a recessed part of the top part in the cavity of the top part. This allows for better integration of the antenna module in the cavity of the top part of the vehicle.

The top part of the vehicle may be any of a roof, a decklid or a spoiler. By being a top part, any interference with other electronics of the vehicle or in the vehicle may be avoided.

In another aspect, an antenna multi module configuration is provided. The antenna multi module configuration may comprise a first high frequency antenna module and a second low frequency antenna module such as AM/FM DAB (Digital Audio Broadcasting) and/or TV antenna unit. The high frequency antenna module may be similar to the antenna modules disclosed hereinbefore. The low frequency antenna module may comprise a low frequency and broadcasting services (LF/BS) antenna unit. The LF/BS antenna unit may be, in some implementations structurally associated to the elongated body of the high frequency antenna module. In other implementations the low frequency antenna module may be integrated in a separate area of the same cavity of the vehicle as the high frequency module or in a separate cavity of the vehicle. The LF/BS antenna unit may be coupled to the same TCU as the antennas of the elongated base.

In another aspect, a vehicle is disclosed. The vehicle may comprise a top part. The top part may comprise a cavity. An antenna module may be integrated in the cavity. The antenna module may be according to examples disclosed herein. The vehicle may further comprise a cover, arranged on top of the cavity to conceal the antenna module in the cavity.

In the examples mentioned herein, The MIMO antennas may be Long Term Evolution (LTE) MIMO antennas.

The foregoing features and elements may be combined in various combinations without exclusivity, unless expressly indicated otherwise. These features and elements, as well as the operation thereof, will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 5 schematically illustrates an antenna module with a 4×4 MIMO antenna, a GNSS antenna and a SDARS antenna, according to an example;

FIG. 6 schematically illustrates an antenna module with a 4×4 MIMO antenna, a GNSS antenna, a SDARS antenna, an RKE antenna and a TCU, according to an example.

DETAILED DESCRIPTION

Figure 1:
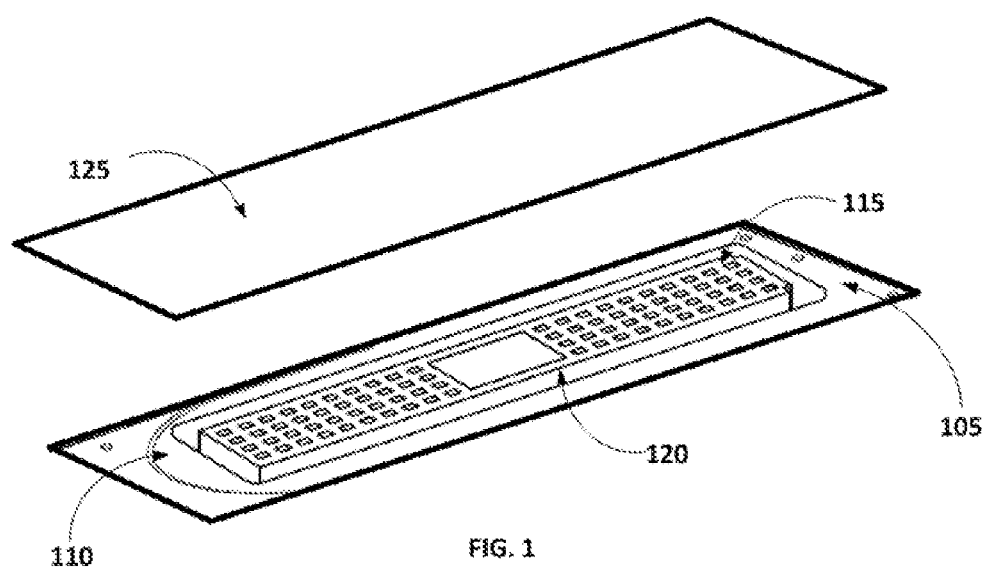
FIG. 1 schematically illustrates an antenna module integrated in a cavity of a top part of a vehicle, according to an example.

FIG. 1 schematically illustrates an antenna module integrated in a cavity of a top part of a vehicle, according to an example. Vehicle 100 may comprise a top part 105. The top part 105 may comprise a cavity 110. The cavity 110 may be sized to host an antenna module 115. The antenna module 115 may comprise an elongated base 120. The elongated base 120 may comprise a plurality of antennas distributed along the elongated base 120 in a way as to maximize isolation between the various antennas. A cover 125 may conceal the antenna module 115 in the cavity and provide protection to the antenna module 115 from external factors, e.g. weather, moisture etc. The cover 125 may be plastic or made of glass, e.g. dark glass, and not from metal, so as to provide non dielectric properties. The antenna module may be coupled (e.g. using a bayonet type mount) to a metallic base. Alternatively, it may be adhered, e.g. glued, to the metallic base. The metallic base may then be attached (e.g. screwed) to the vehicle's frame (chassis). The metallic base may provide grounding for the antenna module's antennas. The metallic base may comprise holes or openings that provide contact points between the antenna module and the vehicle frame.

Figure 2:
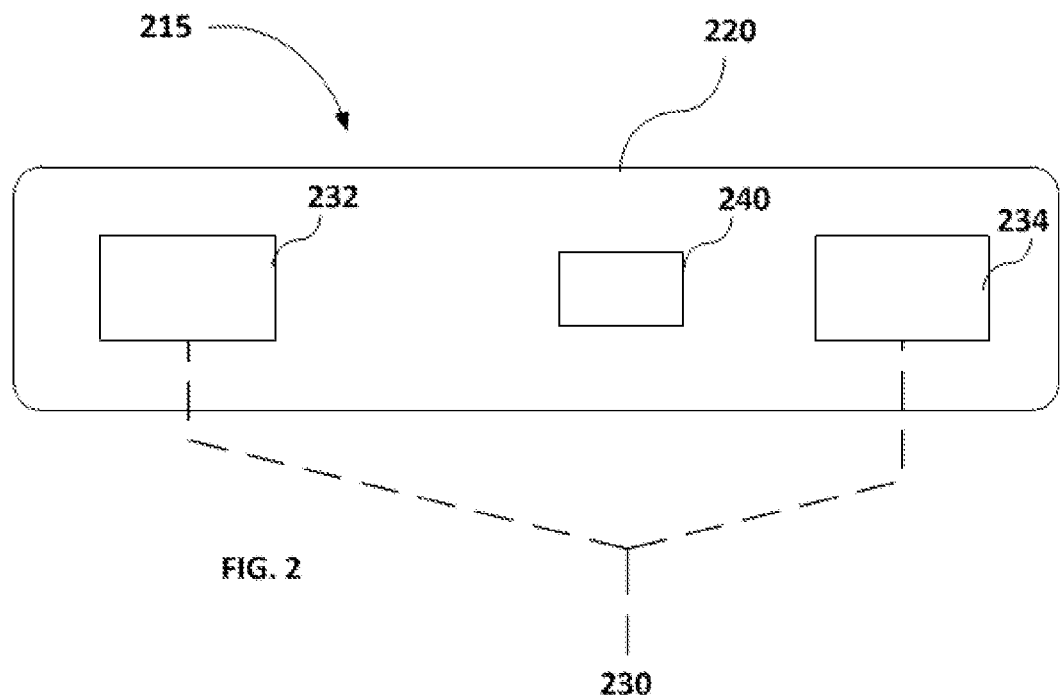
FIG. 2 schematically illustrates an antenna module with a 2×2 MIMO antenna and a GNSS antenna, according to an example.

FIG. 2 schematically illustrates an antenna module with a 2×2 MIMO antenna and a GNSS antenna, according to an example. Antenna module 215 may comprise elongated base 220. A 2×2 MIMO antenna 230 and a GNSS antenna 240 may be distributed along the elongated base 220. The 2×2 MIMO antenna 230 may comprise a first mobile communication antenna 232 and a second mobile communication antenna 234. The first mobile communication antenna 232 may comprise a Tx element and an Rx element. The second mobile communication antenna 234 may comprise an Rx element. The first mobile communication antenna 232 may be arranged at a first end of the elongated base 220 whereas the second mobile communication antenna 234 may be arranged at the second end of the elongated base 220. The GNSS antenna 240 may be arranged between the first and the second mobile communication antennas. The GNSS antenna 240 may be arranged closer to the second mobile communications antenna 234. That is, the distribution may be such that the receiving antennas are placed as far away as possible from the Tx element of the first mobile communication antenna 232. In one example, the isolation requirement between the first and the second mobile communication antennas may be 17 dB and this may be achieved with a distance over 200 mm between the two mobile communication antennas. More specifically, in one example the distance may be at least 216 mm which would provide isolation of 21 dB, i.e. above the requirement. Accordingly, the isolation requirement between the GNSS antenna 240 and the first mobile communication antenna 232 may be 20 dB and this may be achieved with a distance of at least 100 mm between the first mobile communication antenna and the GNSS antenna. The isolation between the second mobile communication antenna 234 and the GNSS may be 10 dB and this may be achieved with a distance of at least 40 mm between the second mobile communication antenna 234 and the GNSS antenna 240. However, as both antennas are receiving, such a requirement is easily achieved. In the example of FIG. 2, the distance between the second mobile communication antenna 234 and the GNSS antenna 240 is 116 mm which provides an isolation of 35 dB. Therefore, the GNSS antenna 240 may be placed closer to the antenna 234 to exceed the isolation requirements. In the example of FIG. 2 the elongated base 220 with a distance between first communication antenna 232 and second communication antenna 234 of 200 mm long is enough to accommodate the three antennas.

When two receiving antennas are arranged one close to the other, no signal interference may occur between them and a lower level of isolation is required. Thus the antennas may be considered as independent. That is, when a load change is produced in one of the antennas this load change should not cause a significant impedance change in the neighboring antenna.

For a system of two antennas the impedance of each one at the presence of the other is described by the following equation:

$$Za = S11 + S21(S1/S2) \qquad \text{Eq. 1}$$

Ideally, S21=0 (Infinite isolation) would be desirable. However, in practical implementations, acceptable performance is achieved by insertion losses, as a consequence of coupling between antennas, of less than 0.5 dB, i.e. less than 10% of the power coupled between the antennas. Hence, a 10% in losses would mean |S21|2=0.1 which would lead to an isolation value of 10 dB.

When Tx antennas are combined there is a Tx signal that goes from one antenna to another. In such cases, the limitation is generated by the receivers connected to the antennas. The Tx signals may cause the incoming signal level in the Rx Antennas to be excessive and saturate them to a point of malfunction. Hence the isolation limit may depend more on the technology (Telephony, GPS, etc.) that is considered and the maximum power with which the system is configured. In case of telephony the maximum transmission power is around 24 dBm and the receivers that are used support maximum signals of 0 dBm. Hence the minimum insulation required is around 20 dB to ensure the correct operation of the receivers near to the transmitters.

Figure 3:
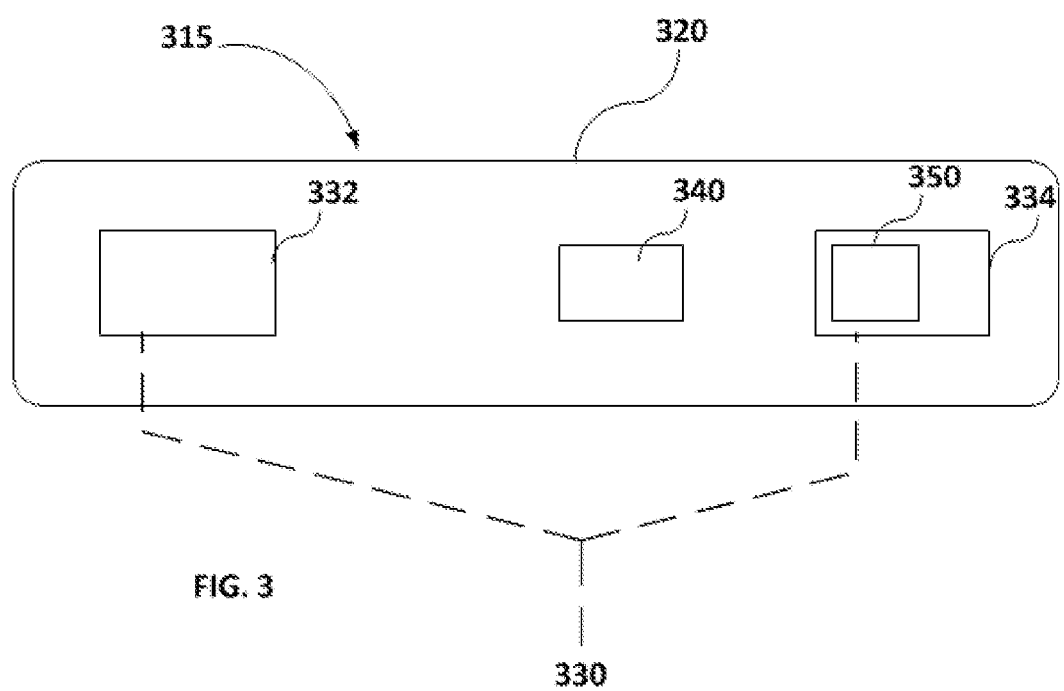
FIG. 3 schematically illustrates an antenna module with a 2×2 MIMO antenna, a GNSS antenna and a SDARS antenna, according to an example.

FIG. 3 schematically illustrates an antenna module with a 2×2 MIMO antenna, a GNSS antenna and a SDARS antenna 350, according to another example. Antenna module 315 may comprise elongated base 320. A 2×2 MIMO antenna 330, a GNSS antenna 340 and a SDARS antenna 350 may be distributed along the elongated base 330. The 2×2 MIMO antenna 330 may comprise a first mobile communication antenna 332 and a second mobile communication antenna 334. The first mobile communication antenna 332 may comprise a Tx element and an Rx element. The second mobile communication antenna 334 may comprise an Rx element. The first mobile communication antenna 332 may be arranged at a first end of the elongated base 330 whereas the second mobile communication antenna 334 may be arranged at the second end of the elongated base 330. The GNSS antenna 340 may be arranged between the first and the second mobile communication antennas. The GNSS antenna 340 may be arranged closer to the second mobile communications antenna 334. That is, the distribution may be such that the receiving antennas are placed as far away as possible from the Tx element of the first mobile communication antenna 332. In one example, the isolation requirement between the first and the second mobile communication antennas may be 17 dB and this may be achieved with a distance over 200 mm between the two mobile communication antennas. More specifically, in one example the distance may be at least 216 mm which would provide isolation of 21 dB, i.e. above the requirement. Accordingly, the isolation requirement between the GNSS antenna 340 and the first mobile communication antenna 332 may be 20 dB and this may be achieved with a distance of at least 100 mm between the first mobile communication antenna and the GNSS antenna 340. The isolation between the second mobile communication antenna 334 and the GNSS may be at least 10 dB and this may be achieved with a distance of at least 40 mm between the second mobile communication antenna 334 and the GNSS antenna 340. However, as both antennas are receiving, such a requirement is easily achieved. In the example of FIG. 3, the distance between the second mobile communication antenna 334 and the GNSS antenna 340 is 116 mm which provides an isolation of 35 dB. Therefore, the GNSS antenna 340 may be placed closer to the antenna 334 to exceed the isolation requirements. Now the SDARS antenna 350 may be placed on top of the second mobile communications antenna 324 and still meet any isolation requirements, even if the SDARS antenna 350 is placed on the first communication antenna 332 still would meet the isolation requirement of at least 20 dB. For example, between the first antenna 332 and the SDARS antenna the isolation requirement may be 20 dB and with a distance of at least 216 mm the isolation achieved may be 30 dB. Accordingly, between the second antenna 334 and the SDARS antenna the isolation requirement may be 10 dB and by placing the antenna on top of the second antenna 334 the isolation achieved may be 20 dB. In the example of FIG. 3 the elongated base with a distance between first communication antenna 332 and second communication antenna 334 of 200 mm long is enough to accommodate the four antennas.

Figure 4A:
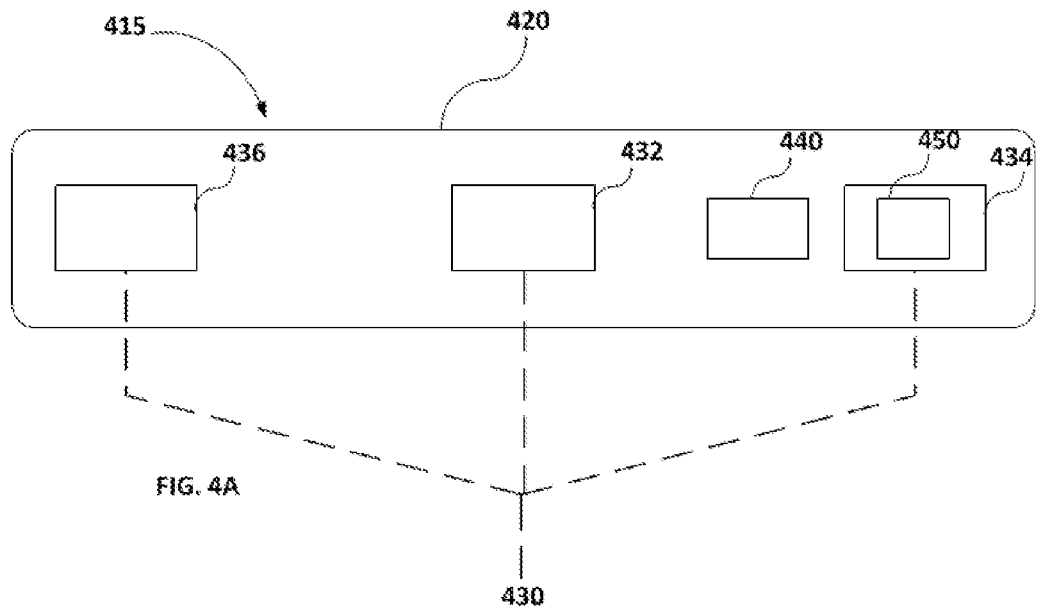
FIG. 4A schematically illustrates an antenna module with a 3×3 MIMO antenna, a GNSS antenna and a SDARS antenna.

FIG. 4A schematically illustrates an antenna module with a 3×3 MIMO antenna, a GNSS antenna and a SDARS antenna, according to an example. Antenna module 415 may comprise elongated base 420. A 3×3 MIMO antenna 430, a GNSS antenna 440 and a SDARS antenna 450 may be distributed along the elongated base 430. The 3×3 MIMO antenna 430 may comprise a first mobile communication antenna 432, a second mobile communication antenna 434 and a third mobile communication antenna 436. The first mobile communication antenna 432 may comprise a Tx element and an Rx element. The second mobile communication antenna 434 may comprise an Rx element. The third mobile communication antenna 436 may also comprise a Tx element and an Rx element. The first mobile communication antenna 432 may be arranged in the middle of the elongated base 420, the second mobile communication antenna 434 may be arranged at a first end of the elongated base 420 and the third mobile communications antenna 436 may be arranged at the second end of the elongated base 420. The GNSS antenna 440 may be arranged between the first mobile communication antenna 432 and the second mobile communication antenna 434. The GNSS antenna 440 may be arranged closer to the second mobile communications antenna 434. That is, the distribution may be such that the receiving antennas are placed as far away as possible from the closer Tx element of the first mobile communication antenna 432. In one example, the isolation requirement between the first and the second mobile communication antennas may be 17 dB and this may be achieved with a distance over 200 mm between the two mobile communication antennas. More specifically, in one example the distance may be at least 216 mm which would provide isolation of 21 dB, i.e. above the requirement. Accordingly, the isolation requirement between the GNSS antenna 440 and the first mobile communication antenna 432 may be 20 dB and this may be achieved with a distance of at least 100 mm between the first mobile communication antenna 432 and the GNSS antenna 440. The isolation between the second mobile communication antenna 434 and the GNSS antenna 440 may be at least 10 dB and this may be achieved with a distance of at least 40 mm between the second mobile communication antenna 434 and the GNSS antenna 440. However, as both antennas are receiving, such a requirement is easily achieved. In the example of FIG. 4, the distance between the second mobile communication antenna 434 and the GNSS antenna 440 is 116 mm which provides an isolation of 35 dB. Therefore, the GNSS antenna 440 may be placed closer to the second mobile communication antenna 434 to exceed the isolation requirements. Now the SDARS antenna 450 may be placed on top of the second mobile communication antenna 434 and still meet any isolation requirements. For example, between the first mobile communication antenna 432 and the SDARS antenna 450 the isolation requirement may be 20 dB and with a distance of at least 216 mm the isolation achieved may be 30 dB. Accordingly, between the second mobile communication antenna 434 and the SDARS antenna 450 the isolation requirement may be 10 dB and by placing the antenna on top of the second mobile communication antenna 434 the isolation achieved may be 20 dB. Now the isolation requirement between the third mobile communication antenna 436 and the first mobile communication antenna 432 may also be 17 dB and this may be achieved with a distance of at least 200 mm between the first antenna and the third antenna, e.g. with a distance of 216 mm. In the example of FIG. 4 the elongated base 420 with a distance between third mobile communication antenna 436 and second mobile communication antenna 434 of 400 mm long may be enough to accommodate the five antennas.

Figure 4B:
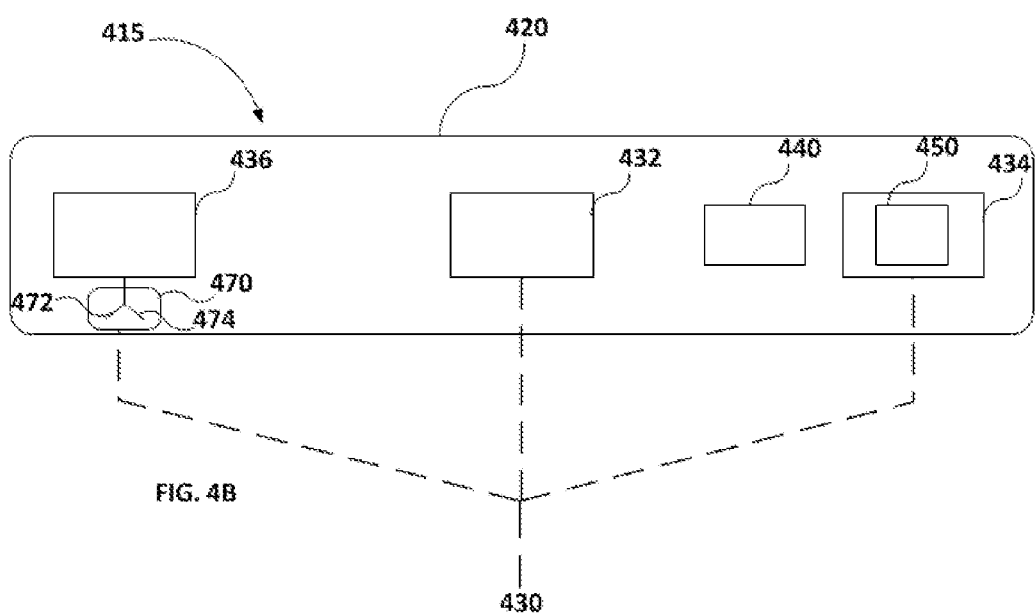
FIG. 4B schematically illustrates an antenna module with a 3×3 MIMO antenna, a GNSS antenna and a SDARS antenna, according to another example.

FIG. 4b schematically illustrates an antenna module with a 3×3 MIMO antenna, a GNSS antenna and a SDARS antenna, according to an example. Antenna module 415 may comprise elongated base 420. A 3×3 MIMO antenna 430, a GNSS antenna 440 and a SDARS antenna 450 may be distributed along the elongated base 420. The 3×3 MIMO antenna 430 may comprise a first mobile communication antenna 432, a second mobile communication antenna 434 and a third mobile communication antenna 436 with a splitter circuit 470 to implement a first communication port 472 and a second communication port 474. The first mobile communication antenna 432 may comprise a Tx element and an Rx element. The second mobile communication antenna 434 may comprise an Rx element. The third mobile communication antenna 436 may comprise a Tx element and an Rx element. This third mobile communication antenna 436 is associated with a splitter circuit 470 which comprises a first communication port 472 with a Tx element and an Rx element and a second communication port 474 with an Rx element. The first mobile communication antenna 432 may be arranged in the middle of the elongated base 420, the second mobile communication antenna 434 may be arranged at a first end of the elongated base 420 and the third mobile communication antenna 436 with its associated splitter circuit 470 may be arranged at the second end of the elongated base 420. The GNSS antenna 440 may be arranged between the first mobile communication antenna 432 and the second mobile communication antenna 434. The GNSS antenna 440 may be arranged closer to the second mobile communications antenna 434. That is, the distribution may be such that the receiving antennas are placed as far away as possible from the closer Tx element of the first mobile communication antenna 432. The distances and isolation requirements between the first mobile communications antenna 432, the second mobile communications antenna 434, the GNSS antenna 440 and the SDARS antenna 450 may be similar to the ones discussed with reference to FIG. 4A. Now the isolation requirement between the third mobile communication antenna 436 and its associated splitter circuit 470 and the first mobile communication antenna 432 may also be 17 dB and this may be achieved with a distance of at least 200 mm between the first mobile communication antenna and the third mobile communication antenna, e.g. with a distance of 216 mm. In the example of FIG. 4B the elongated base 420 with a distance between the third mobile communication antenna 436 and second mobile communication antenna 434 of at least 400 mm long may be enough to accommodate the five antennas with the splitter device circuit 470 associated with the third mobile communication antenna 436.

FIG. 5 schematically illustrates an antenna module with a 4×4 MIMO antenna, a GNSS antenna and a SDARS antenna, according to an example. Antenna module 515 may comprise elongated base 520. A 4×4 MIMO antenna 530, a GNSS antenna 540 and a SDARS antenna 550 may be distributed along the elongated base 520. The 4×4 MIMO antenna 530 may comprise a first mobile communication antenna 532, a second mobile communication antenna 534, a third mobile communication antenna 536 and a fourth mobile communication antenna 538. The first mobile communication antenna 532 may comprise a Tx element and an Rx element. The second mobile communication antenna 534 may comprise an Rx element. The third mobile communication antenna 536 may comprise a Tx element and an Rx element. The fourth mobile communication antenna 538 may comprise an Rx element. The first mobile communication antenna 532 may be arranged at a first end of the elongated base 520. The second mobile communication antenna 534 may be arranged towards the middle of the elongated base 520, at the side of the first end. The third mobile communications antenna 536 may be arranged at the second end of the elongated base 520. The fourth mobile communication antenna 538 may be arranged towards the middle of the elongated base 520 at the side of the second end. The GNSS antenna 540 may be arranged between the first and the second mobile communication antennas. The GNSS antenna 540 may be arranged closer to the second mobile communications antenna 534. That is, the distribution may be such that the receiving antennas are placed as far away as possible from the Tx element of the first mobile communication antenna 532. In one example, the isolation requirement between the first and the second mobile communication antennas may be 17 dB and this may be achieved with a distance over 200 mm between the two mobile communication antennas. More specifically, in one example the distance may be at least 216 mm which would provide isolation of 21 dB, i.e. above the requirement. Accordingly, the isolation requirement between the GNSS antenna 540 and the first mobile communication antenna 532 may be 20 dB and this may be achieved with a distance of at least 100 mm between the first mobile communication antenna and the GNSS antenna 540. As for the isolation between the second mobile communication antenna 534 and the GNSS antenna 540 may be at least 10 dB and this may be achieved with a distance of at least 40 mm between the second mobile communication antenna 534 and the GNSS antenna. However, as both antennas are receiving, such a requirement is easily achieved. In the example of FIG. 5, the distance between the second mobile communication antenna 534 and the GNSS antenna 540 is 116 mm which provides an isolation of 35 dB. Therefore, the GNSS antenna 540 may be placed closer to the second communication antenna 534 to exceed the isolation requirements. Now the SDARS antenna 550 may be placed on top of the first mobile communications antenna 532 and still meet any isolation requirements. For example, between the first mobile communication antenna 532 and the SDARS antenna 550 the isolation requirement may be 20 dB and placed on top the isolation achieved may be 20 dB. Accordingly, between the second antenna 534 and the SDARS antenna the isolation requirement may be 10 dB and of course the isolation achieved is higher than the 10 dB specification. Now the isolation requirement between the third antenna 536 and the second antenna 534 may be 10 dB and this may be achieved with a distance of at least 90 mm between the second antenna and the third antenna. As for the fourth antenna 538, the isolation requirement between the fourth antenna and the third antenna 536 may be similar to the ones between the first and second antennas 532 and 534, respectively. Thus, the distance between the forth and the third antennas 538 and 536, respectively, may be at least 200 mm, for example 216 mm. In the example of FIG. 5 the elongated base with a distance between third mobile communication antenna 536 and first communication antenna 532 of 490 mm long is enough long to accommodate the six antennas.

FIG. 6 schematically illustrates an antenna module with a 4×4 MIMO antenna, a GNSS antenna, a SDARS antenna, an RKE antenna and a TCU, according to an example. Antenna module 615 may comprise elongated base 620. The 4×4 MIMO antenna 630 may comprise a first mobile communication antenna 632, a second mobile communication antenna 634, a third mobile communication antenna 636 and a fourth mobile communication antenna 638. The 4×4 MIMO antenna 630, the GNSS antenna 640, and the SDARS antenna 650 may be similarly distributed as in the example of FIG. 5. The antenna module 615 may further comprise an RKE antenna 660. The RKE antenna 660 may be placed along the elongated base in the space between the third mobile communication antenna 636 and the fourth mobile communication antenna 638 at a distance from the third and fourth mobile communication antennas in order to achieve isolation of at least 10 dB from the Rx antenna and 25 dB from the Tx antenna. For example, at a distance of 58 mm from the Rx antenna the isolation would be 20 dB and at a distance of 100 mm from the Tx antenna the isolation would be 35 dB. However, because the RKE antenna does not share the same spectrum as the GNSS or SDARS antennas, the RKE antenna may be placed adjacent or even on top of the GNSS or the SDARS antenna. The antenna module may further comprise a TCU 680. The TCU 680 may be placed in the space between the second mobile communication antenna 634 and the fourth mobile communication antenna 638. In the example of FIG. 6 the elongated base may be similarly at least 530 mm long to accommodate the seven antennas and the TCU 680.

Figure 7:
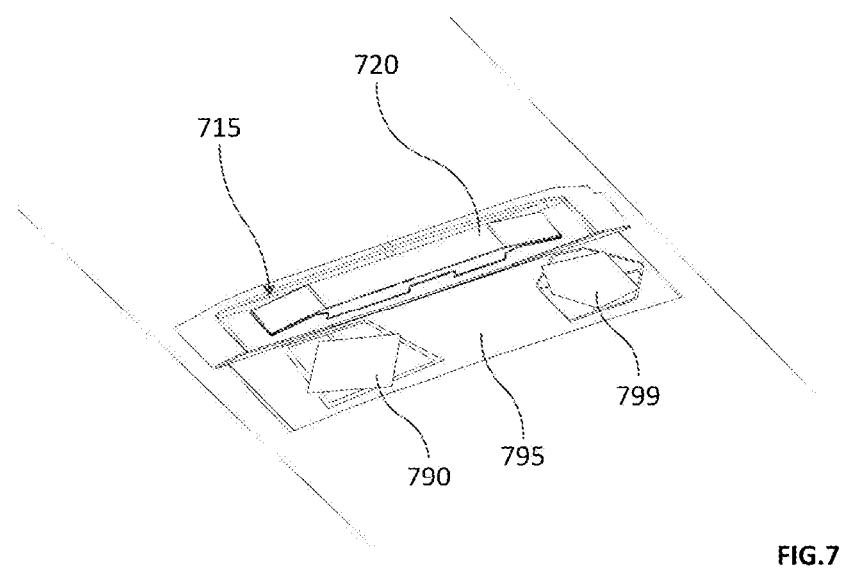
FIG. 7 schematically illustrates an antenna module assembly with an antenna module and an LF/BS antenna unit in a cavity of a top part of a vehicle.

FIG. 7 schematically illustrates an antenna module assembly with an antenna module and an antenna unit having a LF/BS antenna in a cavity of a top part of a vehicle. Antenna module assembly 715 may comprise antenna module 720 with any of the antenna configurations and combinations disclosed herein and described with reference to FIGS. 1 through 6. Furthermore, antenna module assembly 715 may further comprise a LF antenna 790 and/or a BS antenna 799. The LF/BS antenna may be arranged on one or more platforms 795 and may be structurally associated to the antenna module, i.e. it may be attached to the antenna module 720 or to a frame of the cavity.

In all the above example configurations the design may be optimized to improve wireless services coexistence and MIMO performance. It is also mentioned that the shape of the antenna module is just an example. The shape may be adapted according to space and other requirements of a specific vehicle. Furthermore, more than one antenna modules may be provided at different top cover cavities of the vehicle.

While the present disclosure is described with reference to the figures, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

The invention claimed is:
1. An antenna module comprising:
an elongated base, configured to be mounted in a cavity of a top part of a vehicle; and
a plurality of antennas distributed along the elongated base, the plurality of antennas including:
a multiple-input multiple-output (MIMO) mobile communications antenna including at least a first mobile communications antenna and a second mobile communications antenna, the first mobile communications antenna having a transmitting (Tx) and a receiving (Rx) element and the second mobile communications antenna having at least an Rx element, and
a global navigation satellite system (GNSS) antenna being arranged between the first mobile communications antenna and the second mobile communications antenna of the MIMO antenna, wherein a first distance measured between the GNSS antenna and the first mobile communications antenna, and a second distance measured between the GNSS antenna and the second mobile communications antenna are selected to maximize isolation between the antennas, wherein a third distance measured between the first and second mobile communication antennas is selected so that the isolation between the first and second mobile communication antennas is at least 17 dB, and wherein the third distance is at least 200 millimeters.

2. The antenna module according to claim 1, wherein the first distance is measured between the Tx element and the GNSS antenna, and is selected so that the isolation between the Tx element and the GNSS antenna is at least 20 dB, and wherein the first distance is at least 100 millimeters.

3. The antenna module according to claim 1, further comprising:
a Satellite DARS (SDARS) antenna, arranged with and on top of one of the mobile communication antennas.

4. The antenna module according to claim 1, wherein the MIMO antenna includes a third mobile communications antenna having a Tx element and an Rx element, and wherein a fourth distance between the Tx element of the third mobile communications antenna and the first mobile communications antenna is selected so that the isolation between the Tx element of the third mobile communications antenna and the Rx element of the first mobile communications antenna is at least 17 dB.

5. The antenna module according to claim 4, wherein the MIMO antenna includes a fourth mobile communications antenna having at least an Rx element, and wherein a fifth distance between the fourth mobile communication antenna and the second mobile communications antenna is selected so that the isolation between the Rx element of the fourth mobile communication antenna and the Rx element of the second mobile communication antenna is at least 10 dB.

6. The antenna module according to claim 1, further comprising:
a remote keyless entry (RKE) antenna arranged in a space along the elongated base, preferably in a space between two of the mobile communication antennas.

7. The antenna module according to claim 1, further comprising:

a telecommunication control unit (TCU) electrically coupled to each of the plurality of antennas, arranged in a space along the elongated base and in a space between two of the mobile communication antennas.

8. The antenna module according to claim 1, wherein the top part of the vehicle is one of a roof, a decklid, or a spoiler.

9. An antenna module comprising:
an elongated base, configured to be mounted in a cavity of a top part of a vehicle;
a plurality of antennas distributed along the elongated base, the plurality of antennas including:
a multiple-input multiple-output (MIMO) mobile communications antenna including at least a first mobile communications antenna and a second mobile communications antenna, the first mobile communications antenna having a transmitting (Tx) and a receiving (Rx) element and the second mobile communications antenna has an Rx element and does not have a Tx element, and
a global navigation satellite system (GNSS) antenna being arranged between the first mobile communications antenna and the second mobile communications antenna of the MIMO antenna, wherein a first distance measured between the GNSS antenna and the first mobile communications antenna, and a second distance measured between the GNSS antenna and the second mobile communications antenna are selected to maximize isolation between the antennas; and
a Satellite DARS (SDARS) antenna located on top of the second mobile communication antenna.

10. The antenna module according to claim 9, wherein the position of the SDARS antenna is selected so that the isolation between the SDARS antenna and the second mobile communications antenna is at least 10 dB.

11. The antenna module according to claim 10, wherein the MIMO antenna includes a third mobile communications antenna having a Tx element and an Rx element, and wherein a fourth distance between the Tx element of the third mobile communications antenna and the first mobile communications antenna is selected so that the isolation between the Tx element of the third mobile communications antenna and the Rx element of the first mobile communications antenna is at least 17 dB.

12. An antenna module comprising:
an elongated base, configured to be mounted in a cavity of a top part of a vehicle; and
a plurality of antennas distributed along the elongated base, the plurality of antennas including:
a multiple-input multiple-output (MIMO) mobile communications antenna including at least a first mobile communications antenna and a second mobile communications antenna, the first mobile communications antenna having a transmitting (Tx) and a receiving (Rx) element and the second mobile communications antenna having at least an Rx element, and
a global navigation satellite system (GNSS) antenna being arranged between the first mobile communications antenna and the second mobile communications antenna of the MIMO antenna, wherein a first distance measured between the GNSS antenna and the first mobile communications antenna, and a second distance measured between the GNSS antenna and the second mobile communications antenna are selected to maximize isolation between the antennas;

wherein the MIMO antenna includes a third mobile communications antenna having a Tx element and an Rx element, and wherein a fourth distance between the Tx element of the third mobile communications antenna and the first mobile communications antenna is selected so that the isolation between the Tx element of the third mobile communications antenna and the Rx element of the first mobile communications antenna is at least 17 dB, wherein the MIMO antenna includes a fourth mobile communications antenna having at least an Rx element, and wherein a fifth distance between the fourth mobile communication antenna and the second mobile communications antenna is selected so that the isolation between the Rx element of the fourth mobile communication antenna and the Rx element of the second mobile communication antenna is at least 10 dB, and wherein the fourth mobile communication antenna is arranged at a first end of the elongated base, the third mobile communications antenna is arranged at a sixth distance of at least 200 mm from the fourth mobile communication antenna, the second mobile communications antenna is arranged at a seventh distance of at least 90 mm from the third mobile communications antenna, the first mobile communications antenna is arranged at a second end of the elongated base at a third distance of at least 200 mm from the second mobile communication antenna, the first distance is at least 100 mm, and the SDARS is arranged on top of the first mobile communications antenna.

13. The antenna module according to claim 12, further comprising:

a remote keyless entry (RKE) antenna arranged in a space along the elongated base, preferably in a space between two of the mobile communication antennas.

14. The antenna module according to claim 13, further comprising:

a telecommunication control unit (TCU) electrically coupled to each of the plurality of antennas, arranged in a space along the elongated base and in a space between two of the mobile communication antennas.

15. An antenna module comprising:

an elongated base, configured to be mounted in a cavity of a top part of a vehicle; and a plurality of antennas distributed along the elongated base, the plurality of antennas including:
a multiple-input multiple-output (MIMO) mobile communications antenna including at least a first mobile communications antenna and a second mobile communications antenna, the first mobile communications antenna having a transmitting (Tx) and a receiving (Rx) element and the second mobile communications antenna having at least an Rx element, and
a global navigation satellite system (GNSS) antenna being arranged between the first mobile communications antenna and the second mobile communications antenna of the MIMO antenna at a distance to maximize isolation between the antennas, wherein the elongated base has a tapered shape with perforations at the ends to receive screws to be fitted on a recessed part of the top part in the cavity of the top part.

* * * * *